(12) United States Patent
Deisinger et al.

(10) Patent No.: US 8,469,366 B2
(45) Date of Patent: Jun. 25, 2013

(54) EXPANDING BELLOWS FOR SEALING AN ANNULAR GAP

(75) Inventors: Markus Deisinger, Siegburg (DE); Dietmar Oberste, Lohmar, DE (US)

(73) Assignee: GKN Driveline International GmbH, Lohmar (DE)

(*) Notice: Subject to any disclaimer, the term of this patent is extended or adjusted under 35 U.S.C. 154(b) by 932 days.

(21) Appl. No.: 12/467,874

(22) Filed: May 18, 2009

(65) Prior Publication Data

US 2009/0243232 A1 Oct. 1, 2009

Related U.S. Application Data

(63) Continuation of application No. PCT/EP2006/011000, filed on Nov. 16, 2006.

(51) Int. Cl.
*F16D 3/84* (2006.01)
*B29C 49/00* (2006.01)

(52) U.S. Cl.
USPC .......................................... 277/634; 464/175

(58) Field of Classification Search
USPC ............. 277/635, 636; 464/173, 175; 403/50, 403/51
See application file for complete search history.

(56) References Cited

U.S. PATENT DOCUMENTS

| | | | | |
|---|---|---|---|---|
| 4,693,484 A | * | 9/1987 | Ukai et al. | 277/636 |
| 4,730,834 A | | 3/1988 | Ukai et al. | |
| 4,735,596 A | | 4/1988 | Ukai et al. | |
| 5,419,741 A | * | 5/1995 | Schwarzler | 464/175 |
| 5,722,669 A | * | 3/1998 | Shimizu et al. | 277/636 |
| 6,478,309 B1 | * | 11/2002 | Miyamoto et al. | 277/634 |
| 2005/0029750 A1 | * | 2/2005 | Deisinger et al. | 277/635 |
| 2007/0161429 A1 | * | 7/2007 | Villalobos | 464/175 |
| 2007/0225081 A1 | * | 9/2007 | Toriumi | 464/175 |
| 2009/0048029 A1 | * | 2/2009 | Villalobos | 464/139 |

FOREIGN PATENT DOCUMENTS

| | | |
|---|---|---|
| DE | 34 17 709 A1 | 11/1985 |
| DE | 196 15 940 A1 | 3/1997 |
| DE | 102 42 428 A1 | 4/2003 |

OTHER PUBLICATIONS

English Translation of International Search Report and Preliminary Report on Patentability for PCT/EP2006/011000 dated Jun. 10, 2009.
PCT Internaitonal Search Report for PCT/EP2006/011000 dated Apr. 11, 2007.

* cited by examiner

*Primary Examiner* — Gilbert Y Lee
(74) *Attorney, Agent, or Firm* — Rader, Fishman & Grauer, PLLC

(57) ABSTRACT

An expanding bellows is disclosed for sealing an annular gap between two parts, which are connected to one another in a rotationally fixed manner and may be angled to one another, in a constant velocity joint. The expanding bellows has a first larger flange and a second smaller flange and an annular fold area, which extends between the first flange and the second flange, having annular folds implemented as outer folds, each having two annular flanks and a fold peak between two fold valleys. The expanding bellows further comprises a first area of at least two annular folds adjoining the first flange having diameters of the fold peaks and fold valleys decreasing in the direction toward the second flange and a second area having at least one annular fold adjoining the second flange having essentially uniform diameters of the fold valleys. A use of the expanding bellows is also disclosed.

9 Claims, 5 Drawing Sheets

EXPANDING BELLOWS FOR SEALING AN ANNULAR GAP

CROSS-REFERENCE TO RELATED APPLICATIONS

This application is a continuation of International Application No. PCT/EP2006/011000 filed Nov. 16, 2006 which is hereby incorporated by reference in its entirety.

FIELD

The present disclosure relates to an expanding bellows for sealing an annular gap between two parts and use of an expanding bellows of this type.

BACKGROUND

An expanding bellows of the type is disclosed in DE 102 42 428 A1 and is particularly used in sliding constant velocity joints, in which, in addition to the angular movement, an axial displacement is caused between two rotating components. This movement results in a frictional contact between annular flanks on an angle interior on a sealing expanding bellows when the joint is pushed together and angled and excess folding of individual annular folds on the angle exterior when the joint is pulled apart and angled, which may result in buckling of the annular folds or other irregularities. In particular, at high speeds, this may exceed the elasticity of the expanding bellows and result in damage to the expanding bellows. To solve this problem, DE 102 42 428 A1 proposes a specifically implemented expanding bellows, whose ratio of the diameter of the fold peak of the largest annular fold of a first group of annular folds to the diameter of the second flange is $\geq 2.5$, and the two annular flanks of each of the annular folds of the first group forming opposing angles with a radial plane, a smaller angle $\beta$ being formed by the annular flank pointing toward the second flange and a larger angle $\alpha \geq \beta + 25°$ being formed by the annular flank pointing toward the first flange. And finally the annular flanks of each of the annular folds of the first group pointing toward the first flange being curved convexly outward.

Expanding bellows of this type have proven themselves in use, but reach their limits in applications in which very tall angular movements occur, particularly combined with an axial displacement. This is because in this case individual annular folds have their fold valleys come into contact with a shaft on their interior, by which abrasion of the expanding bellows occurs and its service life is accordingly shortened.

Therefore, there exists a need for an expanding bellows which avoids a contact of the fold valleys on the angle interior with a shaft even during tall angular movements and possibly simultaneous axial displacements.

SUMMARY

An expanding bellows is disclosed that includes the feature that at least one transition fold U is situated between a first area and a second area, and in this fold the depth $H_2$ of the fold valley facing toward the first area is less than the depth $H_3$ of the fold valley facing toward the second area. The depths $H_2$ and $H_3$, but also the depth $H_1$, each assigned to fold valleys T1, T2, and T3, are determined starting from a first envelope curve, formed from the fold peak of the transition fold and the fold peak of the annular fold of the first area directly adjacent to the transition fold. The determination of the depth H is performed starting from the first envelope curve along a radial plane R1 which is perpendicular to a longitudinal axis L viewed in the longitudinal direction of the expanding bellow and runs through a smallest outer radius $r_1$ of a fold valley. The expanding bellows according to the disclosure may be conceived in particular for both fixed joints and also for sliding constant velocity joints, the parts connected to one another and rotationally fixed and particularly being implemented so they are axially displaceable to one another.

Through the exemplary design disclosed herein of the expanding bellows, a contact of the inside of the annular fold with the shaft on the angle interior is reliably avoided even in the event of angular movements of greater than 14°, as occur, for example, in off-road vehicles such as SUVs (sport-utility vehicles) and ATVs (all-terrain vehicles). The service life of the expanding bellows is significantly increased in this way. While the first area of annular folds of decreasing size in regard to their diameter predominantly deforms in the form of angling of the individual annular folds to one another, the second area made of at least one annular fold having smaller diameter predominantly absorbs the axial length change by lengthening of the at least one annular fold in operation in a sliding constant velocity joint.

When diameter, in particular of the fold peaks and fold valleys, is referred to in the present application, this always refers to the outer diameter, i.e., the material thickness of the expanding bellows is always also taken into consideration.

The first area of at least two annular folds may comprise up to five annular folds, the second area of annular folds may comprise up to eight annular folds. The number of the annular folds is oriented to the requirement profile of the predetermined deflection angle and length changes. In one particular embodiment, the first area of annular folds has three annular folds and the second area of annular folds has one annular fold, the first area and the second area being connected to one another via one transition fold. However, the present disclosure does not preclude that two or three transition folds may also be provided. Connection areas between the first flange and the first annular fold of the first area and/or between the second flange and the first annular fold of the second area, which are implemented similar to folds, are not complete folds in the meaning of the definition provided in the present disclosure, because they are either missing one fold valley or one fold peak, for example, because one of the annular flanks facing toward the first or the second flange passes directly into the first flange or the second flange, respectively.

The ratio of the depth $H_2$ of the fold valley T2 of the transition fold facing toward the first area to the depth $H_3$ of the fold valley T3 of the transition fold facing toward the second area is in the range from approximately 1 to approximately 1.3. In one exemplary embodiment, the ratio of the depth $H_2$ of the fold valley T2 of the transition fold facing toward the first area to the depth $H_3$ of the fold valley T3 is in the range of approximately 1.08 to approximately 1.2. In yet another embodiment, the ratio is approximately 1.11 to approximately 1.18. In this way, it is ensured that the annular folds are contact-free in relation to an inserted shaft not only in the event of coaxial orientation of the two flanges of the expanding bellows according to the disclosure to one another in the installed situation, but rather a contact in this regard is also reliably avoided in the event of large angular movements, in particular up to about 20°.

Furthermore, in an embodiment of the disclosure, the depth $H_3$ of the fold valley T3 is substantially equal to a depth $H_1$ of a fold valley T1 facing toward the first flange of the annular fold of the first flange directly adjacent to the transition fold. In this way, it is ensured that in the event of an angular movement on the angle interior, no warpings of the individual annular folds occur, in particular the transition fold and also the annular folds of the first area and the second area directly adjacent thereto.

Furthermore, in an embodiment of the disclosure, a first envelope curve runs generally parallel to a second envelope curve, formed from the fold valley T3 of the transition fold facing directly toward the second flange and the fold valley T1 of the first area facing toward the first flange and to be assigned to the annular fold directly adjacent to the transition fold. In this case, generally parallel means that the first and second envelope curves run at an angle of not more than ±10°, and in one particular arrangement, not more than ±5° to one another. In this way, it is further ensured that a contact-free movement of the expanding bellows occurs in operation in relation to an inserted shaft.

In another embodiment of the expanding bellows, an outer diameter D2 of the first annular fold directly adjacent to the first flange is less than an outer diameter D2 of the connection area situated between the first annular fold and the first flange. In this way, an extremely compact construction of the expanding bellows is achieved. Furthermore, the fold peaks of the transition folds are generally less than or equal to the diameter of the fold peaks of the adjacent annular folds of the first area and greater than or equal to the diameter of the fold peaks of the adjacent annular folds of the second area. Furthermore, the fold valleys of the transition fold have a greater diameter than the fold valleys of the annular folds of the second area. Furthermore, the fold valley of a transition fold facing toward the first area has a diameter which is equal to or less than the diameter of the fold valley, facing toward the first flange, of the annular fold of the first area directly adjacent to the transition fold. In one embodiment, the diameters of the fold valleys of a transition fold facing toward the first flange and the annular folds of the first area directly adjacent thereto differ by no more than 10%. During a deflection of a rotary joint, to which the expanding bellows is connected, the expanding bellows also remains contact-free in relation to an inserted shaft in a wide angle range in this way.

An angle $\beta$, formed between a radial plane, which is perpendicular to a longitudinal axis viewed in the longitudinal direction of the folded bellows and runs through a fold peak, and the plane defined by the outside of the annular flank of an annular fold facing toward the second flange, increases in the first area in the direction toward the second flange. In one embodiment, the angle $\beta$ of a first annular fold of the first area directly adjacent to the first flange is in a range from approximately 6° to approximately 8°, the angle $\beta$ for a second annular fold of the first area being in a range from approximately 9° to approximately 11°, and the angle $\beta$ for a third annular fold of the first area being in a range from approximately 16° to approximately 19°.

In one embodiment, the angle $\beta$ of the transition fold generally corresponds to the angle $\beta$ in the second area. This means that the angle $\beta$ of the transition fold may differ in the range of ±5° from the angle $\beta$ in the second area.

An angle $\alpha$, which opposes the angle $\beta$, and is formed between the radial plane R2, which is perpendicular to the longitudinal axis L viewed in the longitudinal direction of the folded bellows and runs through a fold peak, and a straight line G running through the smallest outer radius $r_1$ of a fold valley and a largest outer radius $r_2$ at the fold peak of an annular fold in the first area, fulfills the condition where $\alpha \geq \beta + 20°$ for the transition fold. In one particular embodiment, angle a fulfills the condition where $\alpha \geq \beta + 25°$. Furthermore, in the second area, an angle $\alpha'$, measured between the radial plane R2, which is perpendicular to the longitudinal axis L viewed in the longitudinal direction of the folded bellows and runs through a fold peak, and a plane E' defined by the outside of the annular flank of an annular fold of the second area facing toward the first flange, generally corresponds to the angle $\beta$ in the second area, indicating that a deviation of ±5° may exist here. The annular folds of the second area are thus are generally implemented symmetrically. In contrast, the at least one transition fold has an implementation on the annular flank facing toward the second flange which corresponds to the corresponding annular flanks of the second area, while in contrast the annular flank of the at least one transition fold facing toward the first flange has an implementation which corresponds to the corresponding annular flanks of the first area.

In one particular embodiment, the annular flanks of the first area and/or of the least one transition fold facing toward the first flange have an implementation arched convexly outward. This convex implementation of the annular flanks of the first area and the at least one transition fold stabilizes these folds against buckling and extensively prevents the annular flanks of the individual annular folds from rubbing against one another, in particular during an angular movement of the expanding bellows. Convexly also means that, in relation to the straight line G, the material of the annular flank is predominantly situated above the straight line G.

Through the specific implementation of the at least one transition fold, it is ensured that even during larger angular movements of the expanding bellows, on the one hand, even at high deflection angles, no contact occurs with an inserted shaft on the angle interior, but, on the other hand, individual annular folds are prevented from rubbing against one another, by which the service life of the expanding bellows is increased. The angle $\beta$ of the annular flank of the transition fold facing toward the first flange is approximately 19° to approximately 21°.

In one embodiment, the expanding bellows is formed from at least one thermoplastic-elastomeric material. The thermoplastic elastomeric material may be implemented from a group comprising polyurethanes (TPU), polyester, in particular polyether ester or polyester ester (TPEE), polyamides (TPA), and/or polyolefins (TPO), in particular polypropylenes and/or polyethylenes.

Furthermore, the present disclosure also relates to the use of the expanding bellows for sealing an annular gap in fixed joints and/or sliding constant velocity joints, especially in ATVs and/or SUVs.

BRIEF DESCRIPTION OF THE DRAWINGS

The advantages of the present disclosure are explained in greater detail on the basis of the following figures. In the figures.

DETAILED DESCRIPTION

Figure 1:
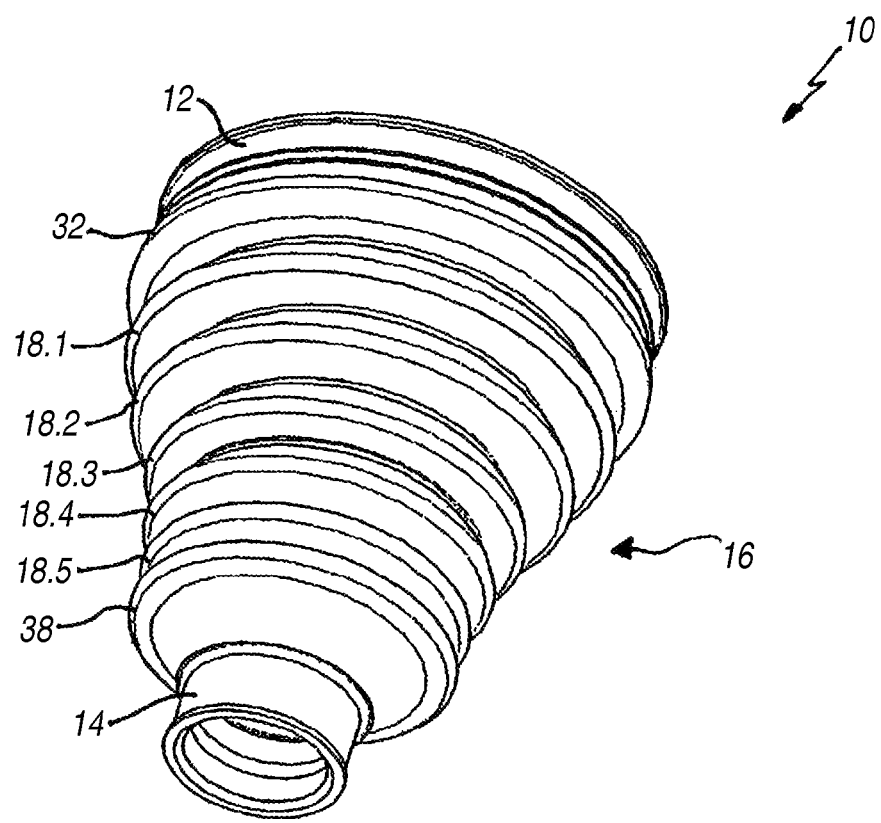
FIG. 1: shows a perspective view of an expanding bellows according to the disclosure.

Firstly, it is stated in advance that the features shown in the figures are not restricted to an individual embodiment.

Rather, the particular features specified in the description, including the description of the figures, and the drawing may be combined with one another for refinements. In particular, the present disclosure is not restricted to the number of annular folds shown in the figures.

FIG. 1 shows a folded bellows according to an embodiment of the present disclosure, identified overall by the reference numeral 10, having a first larger flange 12 and a second smaller flange 14, the first flange 12 being used for fastening the folded bellows 10 on a joint housing outer part and the smaller flange 14 being used for the fastening on a shaft, using a suitable clamping means. A folded area 16 having annular folds 18.1 through 18.5 extends between the two flanges 12 and 14. A connection area 32 is situated between the larger flange 12 and the annular fold 18.1, and a connection area 38 is situated between the smaller flange 14 and the annular fold 18.5 adjacent thereto.

Figure 2:
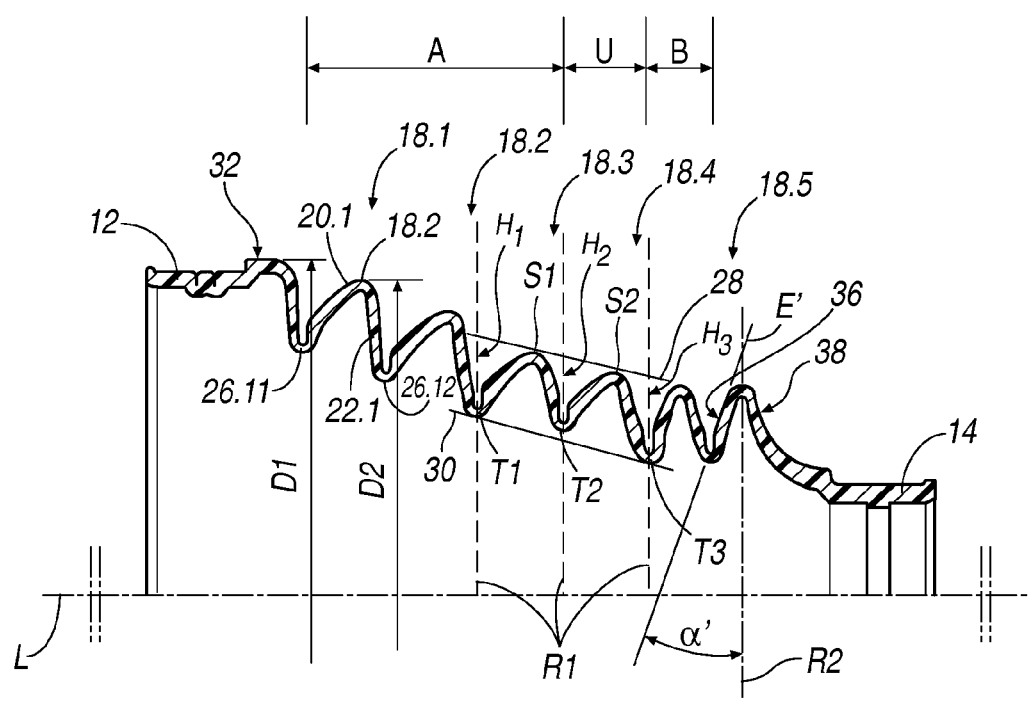
FIG. 2: shows an expanding bellows in longitudinal half-section.
Figure 3A:
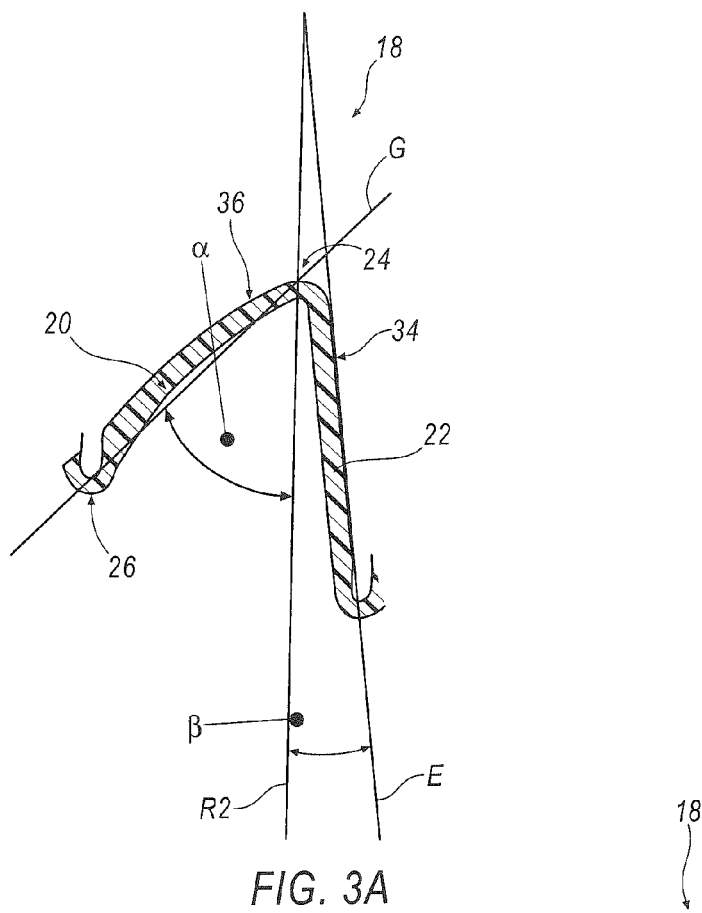
FIG. 3a: shows an annular fold in longitudinal half-section having angle specifications.

FIG. 2 shows a folded bellows 10 according to an embodiment of the present disclosure in a longitudinal half-section having the first flange 12 and the second flange 14 and a total of five annular folds 18.1 through 18.5 situated between them, annular folds 18.1 through 18.3 being assigned to a first area A, while in contrast annular fold 18.4 represents a transition fold U, and the further annular fold 18.5 is assigned to a second area B. The construction of all annular folds 18 is explained in greater detail using the example of the first annular fold 18.1 directly adjacent to the first flange 12. The annular fold 18.1 has an annular flank 20.1 facing toward the first flange 12 and an annular flank 22.1 facing toward the second flange 14. Furthermore, it has a fold peak 24.1 situated between two fold valleys 26.11 and 26.12. An annular flank 20 facing toward the first flange 12 has an outer side 36, as shown in the annular fold 18.1 in FIG. 2. Correspondingly, an annular flank 22 facing toward the smaller flange 14 has an outer side 34, as shown in FIG. 3a.

Furthermore, the configuration of a first envelope curve 28 and a second envelope curve 30 may be seen well from FIG. 2. The first envelope curve 28 is defined by the fold peaks S1 and S2 of the transition fold 18.4 and the annular fold 18.3 of the first area A directly adjacent thereto. The second envelope curve 30, in contrast, is defined by the fold valley T3 of the transition fold 18.4 and the fold valley T1, which faces toward the first flange 12, of the annular fold 18.3 of the first area A directly adjacent to the transition fold 18.4. The two envelope curves 28 and 30 run generally parallel at an angle of approximately 2° to one another. It may be seen clearly from FIG. 2 that the fold valley T2 has a lower height $H_2$ than the fold valley T3 having a height $H_3$. Furthermore, it may be seen that a height $H_1$ of a fold valley T1 is approximately equal to the height $H_3$ of the fold valley T3. The heights $H_1$ through $H_3$ are determined, on the one hand, by the envelope curve 28 and, on the other hand, by a radial plane R1 running through the fold valleys T1 through T3, as may be inferred from FIG. 2. The ratio of $H_2$ to $H_3$ is approximately 1.12. The radial plane R1 is perpendicular to a longitudinal axis L viewed in the longitudinal direction of the expanding bellows 10.

Furthermore, it may be inferred from FIG. 2 that an outer diameter D1 of the connection area 32 is greater than an outer diameter D2 of the first annular fold 18.1 of the first area A. Furthermore, the annular folds 18.1, 18.2, and 18.3 of the first area A have a decreasing diameter in the direction toward the flange 14 of both the fold valleys 26 (and/or T1) and also the fold peaks 24 (and/or S1). In contrast, the annular fold 18.5 of the second area B is implemented as symmetrical and has fold valleys 26 having a generally equal diameter.

The outer diameter of the fold valley T1 is only slightly smaller than the outer diameter of the fold valley T2 (approximately 2%). The transition fold 18.4 has an annular flank 22 facing toward the first flange 14, which corresponds in its geometrical implementation to the corresponding flank 22 of the annular fold 18.5, while in contrast the annular flank 20 of the transition fold 18.4 facing toward the first flange 12 is implemented as arched convexly outward and has a similar geometry as the corresponding annular flanks 20 of the first area A.

Figure 3B:
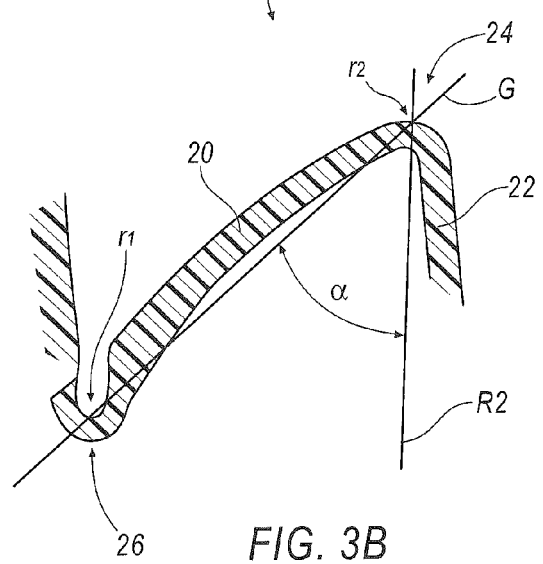
FIG. 3b: shows an annular fold in longitudinal half-section, from which the definition of a straight line G may be seen.

The determination of the angles α and β may be inferred from FIG. 3a. FIG. 3a shows an annular fold 18, which has an annular flank 20 arched convexly outward, as is the case in the first area A, but also in the transition fold U shown in FIG. 2. The same may be inferred from FIG. 3b. The angle β, whether for the first area A or the second area B or for the transition fold U, is determined by a radial plane R2 which runs through a fold peak 24 of the annular fold 18 and is situated perpendicularly to a longitudinal axis L viewed in the longitudinal direction of the folded bellows 10, as may be inferred from FIG. 2. Furthermore, the definition of a plane E, which is defined by the outer side 34 of an annular flank 22 facing toward the second flange 14, may be inferred from FIG. 3a. The angle β is thus defined by the radial plane R2 and the plane E.

The angle α is determined in turn by the radial plane R2, on the one hand, and by a straight line G, which is defined by the smallest radius $r_1$ of a fold valley 26 and the largest outer radius $r_2$ of a fold peak 24, on the other hand. The angle α is defined by the radial plane R2 and the straight line G. To simplify the illustration of the outer radii $r_1$ and $r_2$, circles are specified in the fold valley 26 and on the fold peak 24, respectively, in FIG. 3b.

Furthermore, it may be inferred from FIG. 2 how the angle a' may be determined. This angle is determined correspondingly to the angle β in FIG. 3a, but here a plane E' is defined by the outer side 36 of an annular flank 20, facing toward the first flange 12, of an annular fold of the second area B. The angle α' is defined by the radial plane R2 and the plane E'.

In the second area B, the angle α' is essentially equal to the angle β, as may be inferred from FIG. 2 on the basis of the annular fold 18.5. In contrast, the angle a fulfills the condition $\alpha \geq \beta+25°$ in the first area A, but also in regard to the transition fold 18.4. Furthermore, the angle β increases step-by-step in the first area A including the transition fold 18.4 in the direction toward the second and smaller flange 14, as may be inferred from FIG. 2.

Figure 4:
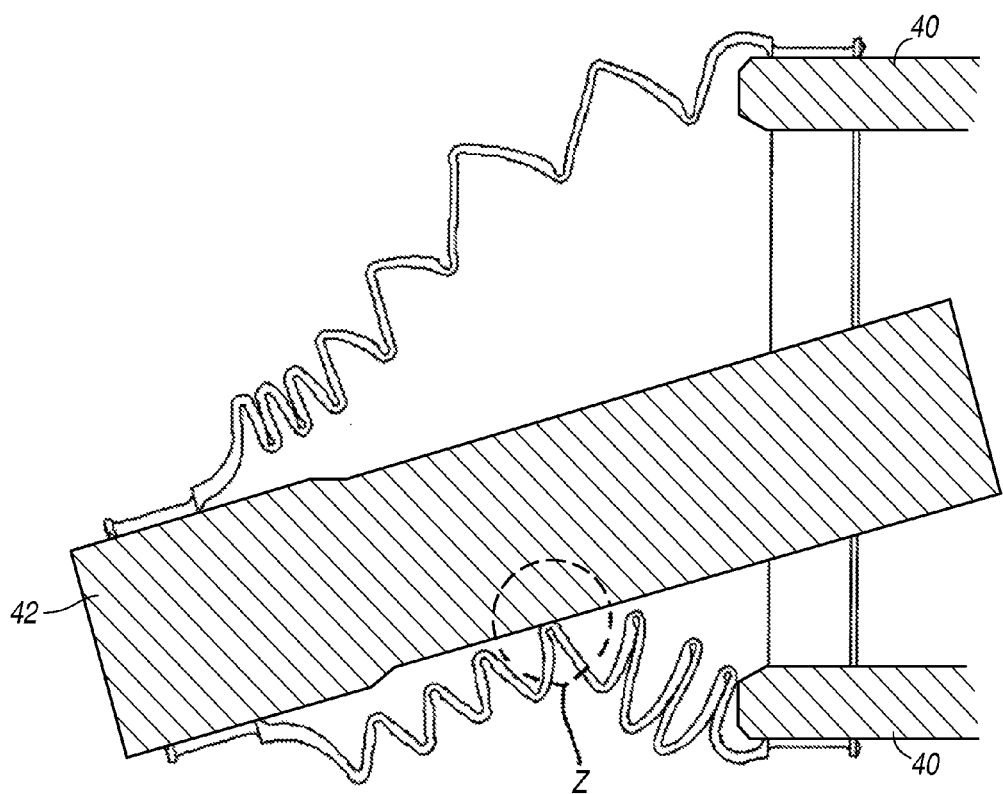
FIG. 4: shows a longitudinal half-section of an expanding bellows according to the prior art, which is fastened on a sliding constant velocity joint in angled position.
Figure 5:
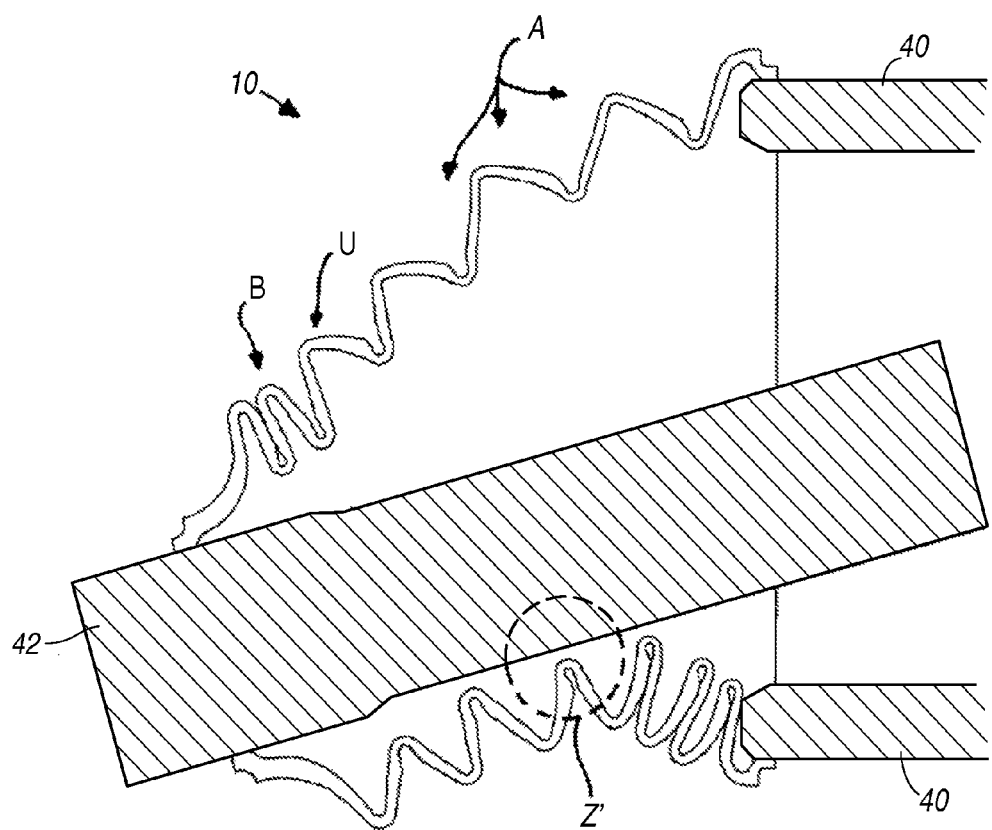
FIG. 5: shows a longitudinal half-section of an expanding bellows according to the present disclosure, which is situated on a sliding constant velocity joint in an angled position.

FIG. 4 shows a longitudinal half-section of an expanding bellows according to the prior art, mounted on a sliding constant velocity joint, in an angled position of approximately 16°, it being illustrated in a detail Z that a shaft 42 comes into contact with the inner side of a fold valley of the expanding bellows according to the prior art on the angle interior. In contrast, the further annular folds do not come into contact with the shaft 42 of the sliding constant velocity joint. In contrast thereto, FIG. 5 shows an expanding bellows 10 according to an embodiment of the disclosure, mounted on a sliding constant velocity joint having an indicated joint housing 40 and a shaft 42, having a first area A having three annular folds and a second area B having one annular fold, and also a transition fold U. As may be inferred from FIG. 5, in a detail Z' corresponding to the detail Z of FIG. 4, a contact is reliably avoided between the inner side of the fold valley, which is situated between the transition fold and the first annular fold of the first area A, and the shaft 42 of the sliding constant velocity joint. In this way, it is possible, on the one hand, to prevent a contact to an inserted shaft 42 even at taller angle settings using the expanding bellows 10 according to the disclosure, and, on the other hand, the service life of the expanding bellows 10 is significantly increased in comparison to those known from the prior art by the prevented friction.

What is claimed is:

1. An expanding bellows for sealing an annular gap between two parts, which are connected in a rotationally fixed manner to one another and may be angled in relation to one another, comprising a first larger flange and a second smaller flange and an annular fold area that extends between the first flange and the second flange, the annular fold area having annular folds implemented as outer folds, each annular fold having two annular flanks and a fold peak between two fold valleys, further comprising:
   a first area (A) of at least two annular folds adjoining the first flange having diameters of the fold peaks and fold valleys which decrease in a direction toward the second flange;
   a second area (B) having at least one annular fold adjoining the second flange having substantially uniform diameters of the fold valleys; and
   at least one transition fold (U) positioned between the first area (A) and the second area (B), a depth of a first transition fold valley facing toward the first area (A) being less than a depth of a second transition fold valley facing toward the second area (B) therein.

2. The expanding bellows according to claim 1, wherein the ratio of the depth of the first transition fold valley of the transition fold (U) facing toward the first area (A) to the depth of the second transition fold valley of the transition fold (U) facing toward the second area (B) is in a range from approximately 1 to approximately 1.3.

3. The expanding bellows according to claim 1, wherein a first envelope curve, formed by a fold peak of the transition fold (U) and a fold peak of the annular fold of the first area (A) directly adjacent to the transition fold (U) runs substantially parallel to a second envelope curve formed by the second transition fold valley of the transition fold (U) directly adjacent to the second area (B) and the first transition fold valley of the first area (A) to be assigned to the annular fold facing toward the first area (A) and directly adjacent to the transition fold (U).

4. The expanding bellows according to claim 1, wherein an outer diameter (D2) of a first annular fold of the at least two annular folds is directly adjacent to the first flange is smaller than an outer diameter of a connection area situated between the first annular fold and the first flange.

5. The expanding bellows according to claim 1, wherein the annular flanks of the first area (A) are implemented as outwardly convex outward.

6. The expanding bellows according to claim 1, wherein the depth ($H_3$) of the second transition fold valley (T3) facing toward the second area (B) is substantially equal to a depth ($H_1$) of a first area fold valley (T1), which faces toward the first flange of a first annular fold of at least two annular folds in the first area (A) directly adjacent to the transition fold (U).

7. The expanding bellows according to claim 1, wherein expanding bellows is produced from at least one thermoplastic-elastomeric material.

8. The expanding bellows according to claim 1, wherein the annular flanks of the transition fold (U) facing toward the first flange are implemented as outwardly convex.

9. An expanding bellows for sealing an annular gap between two parts, which are connected in a rotationally fixed manner to one another and may be angled in relation to one another, comprising a first larger flange and a second smaller flange and an annular fold area that extends between the first flange and the second flange, the annular fold area having annular folds implemented as outer folds, each annular fold having two annular flanks and a fold peak between two fold valleys (T1, T3), further comprising:
   a first area of at least two annular folds adjoining the first flange having diameters of the fold peaks and fold valleys (T1, T3) which decrease in a direction toward the second flange;
   a second area having at least one annular fold adjoining the second flange having substantially uniform diameters of the fold valleys (T1, T3); and
   at least one transition fold configured between the first area and the second area, a depth ($H_1$) of a first transition fold valley (T1) facing toward the first area being less than a depth ($H_3$) of a second transition fold valley (T3) facing toward the second area therein,
   wherein the depth ($H_3$) of the second transition fold valley (T3) facing toward the second area is substantially equal to a depth ($H_1$) of a first area fold valley (T1), which faces toward the first flange of a first annular fold of at least two annular folds in the first area directly adjacent to the transition fold.

* * * * *